United States Patent [19]
Kutner

[11] Patent Number: 4,786,968
[45] Date of Patent: Nov. 22, 1988

[54] GAMMA CORRECTION OF DIGITAL VIDEO DATA BY CALCULATING LINEARLY INTERPOLATED GAMMA CORRECTION VALUES

[75] Inventor: Michael A. Kutner, Palo Alto, Calif.

[73] Assignee: Sony Corporation, Tokyo, Japan

[21] Appl. No.: 74,272

[22] Filed: Jul. 16, 1987

[51] Int. Cl.⁴ .......................................... H04N 5/202
[52] U.S. Cl. .................................... 358/164; 358/169
[58] Field of Search ............... 358/32, 163, 164, 169, 358/166, 168, 80, 280

[56] References Cited

U.S. PATENT DOCUMENTS

| | | | |
|---|---|---|---|
| 4,394,688 | 7/1983 | Iida et al. | 358/164 |
| 4,396,938 | 8/1983 | Dischert | 358/21 R |
| 4,641,267 | 2/1987 | Asai et al. | 358/280 |
| 4,670,788 | 6/1987 | Ozaki | 358/164 |
| 4,688,095 | 8/1987 | Beg et al. | 358/166 |
| 4,689,691 | 8/1987 | Isogai et al. | 358/80 |

FOREIGN PATENT DOCUMENTS 10368 1/1986 Japan .................................. 358/164

*Primary Examiner*—John W. Sheppard
*Attorney, Agent, or Firm*—Philip M. Shaw, Jr.

[57] ABSTRACT

An apparatus, including a lookup table memory, for gamma correcting a digital video signal based on the assumption that for small gamma, gamma correction is a linear function so that for a digital video input signal value x a gamma correction value d to be added to x can be calculated as a function of an opertor selected variable a according to the formulae:

$$d = 10 \cdot 0 \cdot (x - x^{1.10})$$

or $$d = 10 \cdot 9 \cdot (x - x^{.90}).$$

4 Claims, 3 Drawing Sheets

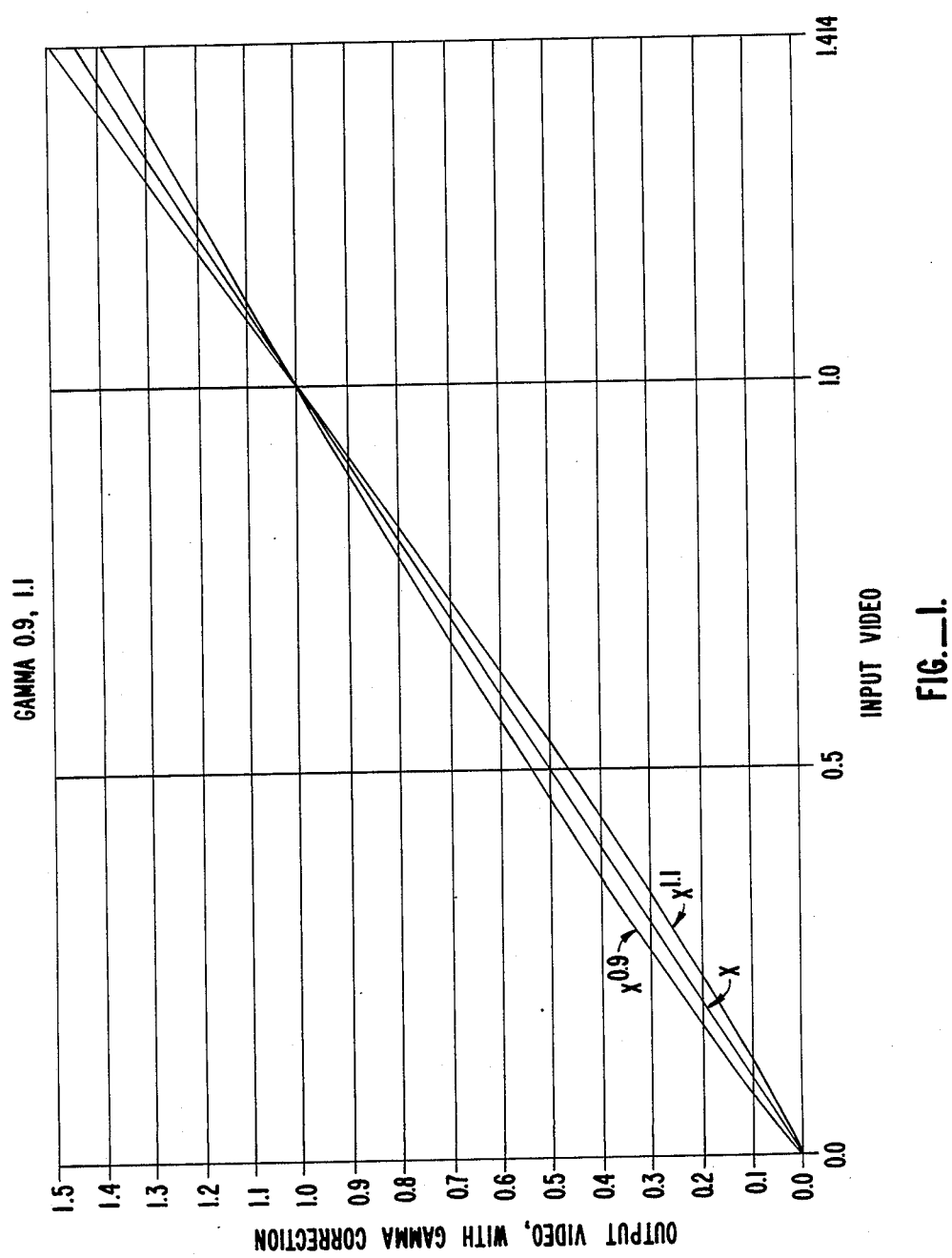
FIG.—1.

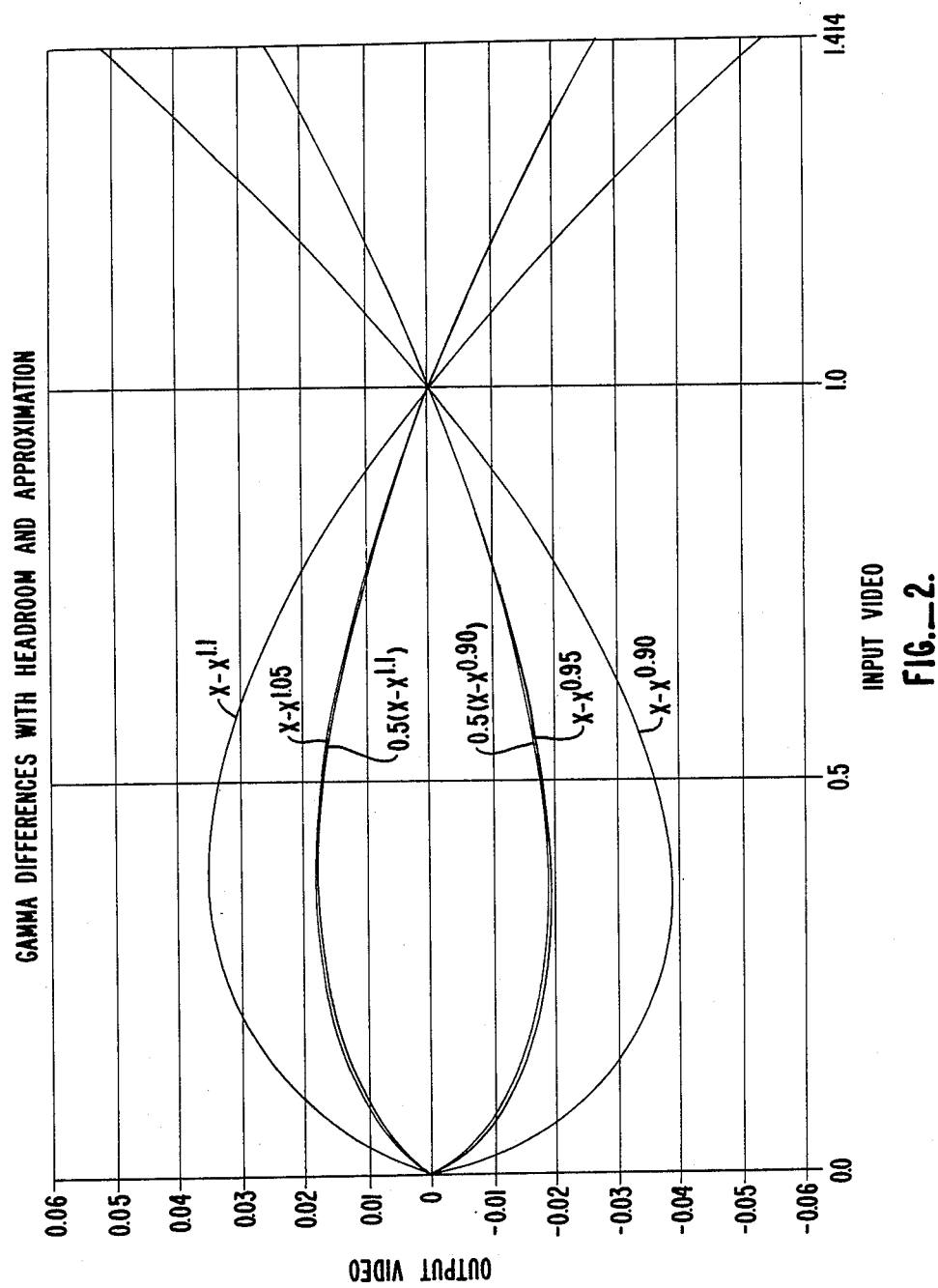
FIG._2.

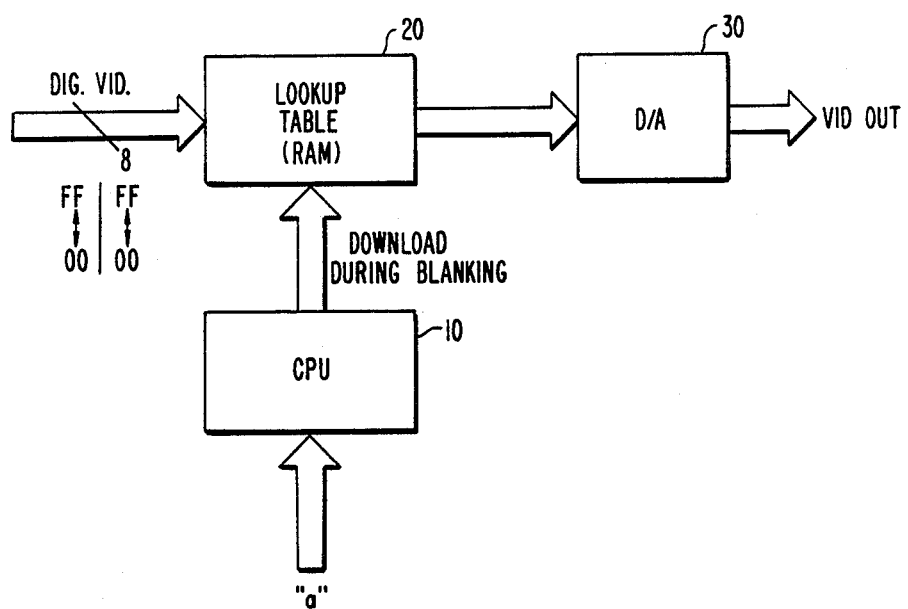
FIG._3.

GAMMA CORRECTION OF DIGITAL VIDEO DATA BY CALCULATING LINEARLY INTERPOLATED GAMMA CORRECTION VALUES

DESCRIPTION

1. Technical Field

This invention relates to computer generated graphic display systems and, more particularly, to such a system which employs a cathode ray tube display and which has gamma correction.

2. Background Art

"Gamma Correction" is the nonlinear expansion or compression of video signals. This correction is often used to compensate for nonlinearities in television cameras and monitors, or to increase the picture detail of very dark or very light images. Often, analog methods are used to perform gamma correction. However, using this method for digital video signals is complicated. Furthermore, because the gamma function is exponential, digital correction can be time consuming. What is needed is a method of quickly performing digital gamma correction on digitized video signals.

SUMMARY OF THE INVENTION

The above and other problems which complicate gamma correction on cathode ray tubes displays and cameras are overcome by the present invention of a circuit for gamma correcting digital video data comprising means for calculating linearly interpolated gamma correction values as a function of a variable and lookup table means, loaded with said linearly interpolated gamma correction values, for receiving input digital video signals and outputting a corresponding digital video signal as corrected by adding to the input signal said linearly interpolated gamma correction values.

In a preferred embodiment of the invention, said linearly interpolated gamma correction values (d) are calculated according to the formula:

$$d = 10 \cdot a \cdot (x - x^{1.10})$$

or $$d = 10 \cdot a \cdot (x - x^{0.90}),$$

where a is an operator selected variable.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a gamma correction curve showing that a gamma corrected value is very close to the original value for gamma close to 1.0;

FIG. 2 is a gamma correctin curve for particular values; and

FIG. 3 is a block diagram illustrating the present invention.

BEST MODE FOR CARRYING OUT THE INVENTION

The gamma correction method according to the invention takes advantage of the fact that, for small a, $x^{1.0+a}$ is almost linear. This approximation can be applied to generate a lookup table that is used on digital video data to perform gamma correction without the use of exponentiation.

The basic formula for gamma correction is $$\text{Ti } x' = x^\gamma.$$

As can be seen in FIG. 1, x' is very close to x for $\gamma$ close to 1.0. Gamma correction can be viewed as adding a small, variable offset to a straight line to make the line nonlinear. In this case, one can look at the "difference" between x and x'. This difference is $$d = x - x' = x - x^\gamma.$$

Since $\gamma$ is very close to 1.0, this difference can also be written $$d = x - x^{(1.0+a)},$$

$$d = x - x^{(1.0-a)}.$$

This invention asserts that, for small a, a linear interpolation can be used as an approximation to exponentiation. For example, $$d = x - x^{(1.0+a)} = 10 \cdot a \cdot (x - x^{1.10}),$$

$$d = x - x^{(1.0-a)} = 10 \cdot a \cdot (x - x^{0.90}).$$

FIG. 2 shows one particular example:

$$x - x^{1.05} = 0.5 \cdot (x - x^{1.10}),$$

$$x - x^{0.95} = 0.5 \cdot (x - x^{0.90}).$$

Note the close fit between the approximated and actual curves. This approximation can be rewritten:

$$x^{(1.0+a)} = x - (10 \cdot a \cdot (x - x^{1.10})),$$

$$x^{(1.0-a)} = x - (10 \cdot a \cdot (x - x^{0.90})).$$

If lookup tables are made for $(x - x^{1.10})$ and $(x - x^{0.90})$, digital gamma correction can be done with one lookup, one multiply, and one subtraction.

Referring now to FIG. 3, a CPU 10 receives an input digital variable "a" (which can be generated by a control knob and suitable analog to digital conversion means) and from this value calculates the gamma corrected lookup values for x for the given value of a supplied by the operator:

$$x^{(1.0+a)} = x - (10 \cdot a \cdot (x - x^{1.10})),$$

$$x^{(1.0-a)} = x - (10 \cdot a \cdot (x - x^{0.90})).$$

These lookup values for x are downloaded by the CPU 10 during the vertical blanking interval into a lookup table memory circuit (RAM) which receives as its input (x) digital video (DIG. VID.) signals and outputs to a digital to analog converter 30 the corresponding gamma corrected value stored in the lookup table 20. The gamma corrected analog video is output from the converter 30.

Although the present invention has been shown and described with respect to preferred embodiments, various changes and modifications which are obvious to a person skilled in the art to which the invention pertains are deemed to lie within the spirit and scope of the invention.

What is claimed is:

1. Apparatus for gamma correcting an input digital video signal comprising:
   means for calculating linearly interpolated gamma correction values (d) according to one of the formulae:

$$d = 10 \cdot a \cdot (x - x^{1.10})$$

or $$d = 10 \cdot a \cdot (x - x^{0.90}),$$

where a is an operator selected variable; and
   lookup table means, loaded with said linearly interpolated gamma correction values, for receiving input digital video signals and outputting a corresponding digital video signal as corrected by adding to the input signal corresponding linearly interpolated gamma correction values.

2. Apparatus for gamma correcting an input digital video signal comprising:
   lookup table means, including a digital memory, for storing gamma corrected, digital video signal values, receiving input digital video signals and outputting gamma corrected digital video signals corresponding to said input digital video signals; and
   means for calculating linearly interpolated gamma correction lookup table values according to one of the formulae:
   $$d = 10 \cdot a \cdot (x - x^{1.10})$$

or $$d = 10 \cdot a \cdot (x - x^{0.90}),$$

where d is the value to be added to an input digital video signal having a value x and a is an operator selected variable and loading said lookup table values into said digital memory.

3. Apparatus for gamma correcting an input digital video signal as recited in claim 2 wherein said means for calculating downloads said calculated gamma correction lookup table values during the vertical blanking period of the input digital video signal.

4. A method of gamma correcting an input digital video signal comprising the steps of:
   calculating linearly interpolated gamma correction values (d) according to either of the formulae:

$$d = 10 \cdot a \cdot (x - x^{1.10})$$

or $$d = 10 \cdot a \cdot (x - x^{0.90}),$$

where a is an operator selected variable;
   loading said linearly interpolated gamma correction values into a digital lookup table; and
   receiving input digital video signals at the digital lookup table and outputting a corresponding digital video signal as corrected by adding to the input signal corresponding linearly interpolated gamma correction values stored in the lookup table.

* * * * *